(12) United States Patent
Chen et al.

(10) Patent No.: US 12,502,953 B2
(45) Date of Patent: Dec. 23, 2025

(54) DRIVE ASSEMBLY AND VEHICLE

(71) Applicant: SEGWAY TECHNOLOGY CO., LTD., Changzhou (CN)

(72) Inventors: Hongbo Chen, Changzhou (CN); Zhengchang Deng, Changzhou (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 699 days.

(21) Appl. No.: 17/908,655

(22) PCT Filed: Mar. 3, 2021

(86) PCT No.: PCT/CN2021/078901
§ 371 (c)(1),
(2) Date: Sep. 1, 2022

(87) PCT Pub. No.: WO2021/175255
PCT Pub. Date: Sep. 10, 2021

(65) Prior Publication Data
US 2023/0105272 A1 Apr. 6, 2023

(30) Foreign Application Priority Data
Mar. 3, 2020 (CN) .......................... 202020244901.6

(51) Int. Cl.
*B60K 17/04* (2006.01)
*B60K 1/00* (2006.01)
(Continued)

(52) U.S. Cl.
CPC ................ *B60K 17/04* (2013.01); *B60K 1/00* (2013.01); *B60K 17/344* (2013.01); *F16H 1/20* (2013.01);
(Continued)

(58) Field of Classification Search
CPC ......... B60K 17/04; B60K 1/00; B60K 17/344
See application file for complete search history.

(56) References Cited

U.S. PATENT DOCUMENTS

| | | | |
|---|---|---|---|
| 5,832,789 A | * | 11/1998 | Kinto .................... H02K 7/116 74/421 A |
| 11,713,803 B1 | * | 8/2023 | Coppola ................ H02K 7/006 74/606 R |

(Continued)

FOREIGN PATENT DOCUMENTS

| | | |
|---|---|---|
| CN | 201342939 Y | 11/2009 |
| CN | 108944391 A | 12/2018 |

(Continued)

OTHER PUBLICATIONS

International Search Report and Written Opinion dated Jun. 9, 2021 for Application No. PCT/CN2021/078901, 12 pages.

*Primary Examiner* — Brian L Swenson
(74) *Attorney, Agent, or Firm* — Frost Brown Todd LLP

(57) ABSTRACT

A drive assembly includes: a reduction gearbox including a reduction gearbox housing, a reduction gearbox input shaft, and a reduction gearbox output component, the reduction gearbox input shaft and the reduction gearbox output component being drivingly connected to each other and arranged in the reduction gearbox housing; a motor including a motor housing, a motor stator, and a motor rotor, the motor stator being arranged in the motor housing and fixedly connected to the motor housing, the motor rotor being arranged in the motor stator, the motor rotor including a motor output shaft drivingly connected to the reduction gearbox input shaft; and an axle including an axle housing and an axle input shaft arranged in the axle housing, the axle input shaft being drivingly connected w the reduction gearbox output com- (Continued)

ponent. The motor housing and the axle housing are fixedly connected to the reduction gearbox housing.

19 Claims, 3 Drawing Sheets

(51) Int. Cl.
    *B60K 17/344*     (2006.01)
    *F16H 1/20*     (2006.01)
    *F16H 1/22*     (2006.01)
    *F16H 57/021*     (2012.01)
    *F16H 57/04*     (2010.01)
    *F16H 57/02*     (2012.01)

(52) U.S. Cl.
    CPC ............. *F16H 1/22* (2013.01); *F16H 57/021* (2013.01); *F16H 57/0436* (2013.01); *B60K 2001/001* (2013.01); *B60K 2001/006* (2013.01); *F16H 2057/02034* (2013.01); *F16H 2057/02052* (2013.01)

(56) References Cited

U.S. PATENT DOCUMENTS

| | | | | |
|---|---|---|---|---|
| 2003/0209379 | A1* | 11/2003 | Bateman | B60K 17/04 |
| | | | | 180/308 |
| 2019/0032761 | A1* | 1/2019 | Shentu | F16H 48/08 |
| 2019/0186617 | A1* | 6/2019 | Verbridge | B60K 6/365 |
| 2021/0316609 | A1* | 10/2021 | Yuan | B60K 17/06 |
| 2021/0332877 | A1* | 10/2021 | Li | F16H 57/031 |
| 2022/0203827 | A1* | 6/2022 | Engerman | F16H 63/3416 |
| 2022/0266676 | A1* | 8/2022 | Zheng | B60K 6/46 |
| 2023/0160464 | A1* | 5/2023 | Devreese | B60K 1/00 |
| | | | | 475/150 |

FOREIGN PATENT DOCUMENTS

| | | |
|---|---|---|
| CN | 110247524 A | 9/2019 |
| CN | 110356223 A | 10/2019 |
| CN | 210101320 U | 2/2020 |
| CN | 210526278 U | 5/2020 |
| WO | WO 2019/118866 A1 | 6/2019 |

\* cited by examiner

DRIVE ASSEMBLY AND VEHICLE

CROSS-REFERENCE TO RELATED APPLICATION

The present application is a national phase entry under 35 USC § 371 of International Application No. PCT/CN2021/078901, filed on Mar. 3, 2021, which claims the benefit of priority to Chinese Patent Application No. 202020244901.6 filed on Mar. 3, 2020, the entire contents of which are incorporated herein by reference.

FIELD

The present disclosure relates to a field of vehicles, and in particular, to a drive assembly and a vehicle.

BACKGROUND

For a vehicle, a drive assembly with a more compact structure can save space occupied by the drive assembly, so as to prevent unnecessary space occupation, and free up more available space for the vehicle, or facilitate the overall miniaturization of the vehicle. Therefore, how to make the structure of the drive assembly of the vehicle more compact is a technical problem faced by those skilled in the art.

SUMMARY

Embodiments of a first aspect of the present disclosure provide a drive assembly. The drive assembly includes: a reduction gearbox including a reduction gearbox housing, a reduction gearbox input shaft, and a reduction gearbox output component, the reduction gearbox input shaft and the reduction gearbox output component being arranged in the reduction gearbox housing, the reduction gearbox input shaft being drivingly connected to the reduction gearbox output component; a motor including a motor housing, a motor stator, and a motor rotor, the motor stator being arranged in the motor housing and fixedly connected to the motor housing, the motor rotor being arranged in the motor stator, the motor rotor including a motor output shaft, the motor output shaft being drivingly connected to the reduction gearbox input shaft; and an axle including an axle housing and an axle input shaft arranged in the axle housing, the axle input shaft being drivingly connected to the reduction gearbox output component. The motor housing and the axle housing are fixedly connected to the reduction gearbox housing.

Embodiments of a second aspect of the present disclosure provide a vehicle. The vehicle includes a drive assembly. The drive assembly includes: a reduction gearbox including a reduction gearbox housing, a reduction gearbox input shaft, and a reduction gearbox output component, the reduction gearbox input shaft and the reduction gearbox output component being arranged in the reduction gearbox housing, the reduction gearbox input shaft being drivingly connected to the reduction gearbox output component; a motor including a motor housing, a motor stator, and a motor rotor, the motor stator being arranged in the motor housing and fixedly connected to the motor housing, the motor rotor being arranged in the motor stator, the motor rotor including a motor output shaft, the motor output shaft being drivingly connected to the reduction gearbox input shaft; and an axle including an axle housing and an axle input shaft arranged in the axle housing, the axle input shaft being drivingly connected to the reduction gearbox output component. The motor housing and the axle housing are fixedly connected to the reduction gearbox housing.

DETAILED DESCRIPTION

It is to be noted that the embodiments in the present disclosure and technical features in the embodiments may be combined with each other in the absence of conflict. The detailed description should be construed as an explanation of the purpose of the present disclosure and shall not be regarded as an undue restriction on the present disclosure.

Figure 1:
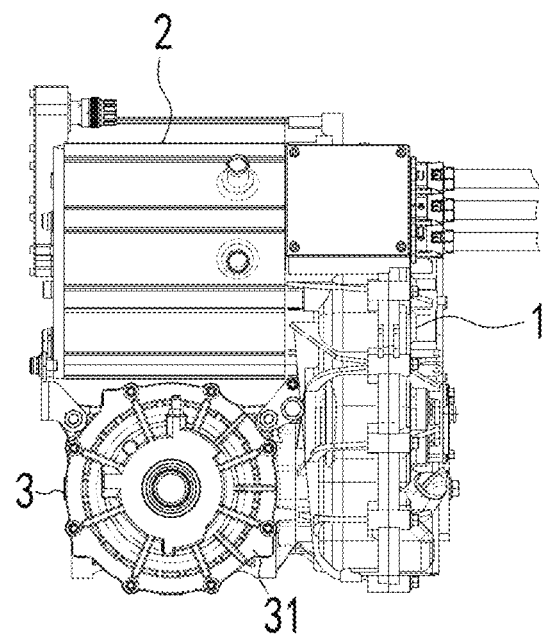
FIG. 1 is a schematic view of a drive assembly according to an embodiment of the present disclosure.

In the description of the present disclosure, terms such as "top" and "bottom" indicate an orientation or position relationship based on the orientation or position relationship illustrated. FIG. 1. FIG. 1 shows a plan view formed by projecting from a top of a drive assembly to a bottom of the drive assembly. The top of the drive assembly is shown in FIG. 1, and the other side of the drive assembly perpendicular to a projection plane where FIG. 1 is located is the bottom of the drive assembly. It is to be understood that such orientation terms are only for convenience of description of the present disclosure or for simplifying the description, and do not indicate or imply that the apparatus or element referred to must have a particular orientation or be constructed and operated in a specific orientation, and hence cannot be construed as limitations on the present disclosure.

In the description of the present disclosure, "drivingly connected" means that when one of two connection objects forming a driving connection rotates, the other one of the two connection objects may rotate accordingly. For example, a reduction gearbox input shaft 12 is drivingly connected to a reduction gearbox output component 13. When the reduction gearbox input shaft 12 rotates, the reduction gearbox output component 13 may rotate with the rotation of the reduction gearbox input shaft 12. In addition, "fixedly connected" means that two connection objects forming a fixed connection cannot move relative to each other.

In the description of the present disclosure, if a part has a central axis, "an inner side" of the part refers to a side of the part close to the central axis of the part, and "an outer side" of the pan refers to a side of the part away from the central axis of the part. For example, the reduction gearbox input shaft 12 has a first central axis 122, an inner side of the reduction gearbox input shaft 12 is a side of the reduction gearbox input shaft 12 close to the first central axis 122, and an outer side of the reduction gearbox input shaft 12 is a side of the reduction gearbox input shaft 12 away from the first central axis 122. For example, an inner side of a first transmission shaft 145 is a side of the first transmission shaft 145 close to a central axis of the first transmission shaft 145, and an outer side of the first transmission shaft 145 is a side of the first transmission shaft 145 away from the central axis of the first transmission shaft 145.

As part of the creative conception of the solution in the present disclosure, before the embodiment of the present disclosure is described, there is a need to analyze the reason why the drive assembly in the related art has a relatively scattered structure and occupies a large space, so as to obtain the technical solution of the embodiment of the present disclosure through reasonable analysis.

Through analysis, it is found that in the existing drive assembly, a motor 2, a reduction gearbox 1, and an axle are typically three separate components. When such components are drivingly connected in pairs, a gap may be left between a motor housing 211 of the motor 2 and a reduction gearbox housing 11 of the reduction gearbox 1, resulting in unnecessary space occupation. A gap may also exist between an axle housing and the reduction gearbox housing 11, resulting in unnecessary space occupation. If such gaps are removed to enable the motor 2 and the axle to be integrated into the reduction gearbox 1, it is expected that the drive assembly may have a more compact structure.

In view of this, an embodiment of the present disclosure provides a vehicle. The vehicle includes a drive assembly.

In an embodiment, the vehicle may be an all-terrain vehicle.

Referring to FIG. 1 to FIG. 4, the drive assembly according to the embodiment of the present disclosure includes a reduction gearbox 1, a motor 2, and an axle. The reduction gearbox 1 includes a reduction gearbox housing 11, a reduction gearbox input shaft 12, and a reduction gearbox output component 13. The reduction gearbox input shaft 12 and the reduction gearbox output component 13 are arranged in the reduction gearbox housing 11, and the reduction gearbox input shaft 12 is drivingly connected to the reduction gearbox output component 13. The motor 2 includes a motor housing 211, a motor stator 212, and a motor rotor 22. The motor stator 212 is arranged in the motor housing 211 and fixedly connected to the motor housing 211. The motor rotor 22 is arranged in the motor stator 212. The motor rotor 22 includes a motor output shaft 221. The motor output shaft 221 is drivingly connected to the reduction gearbox input shaft 12. The axle includes an axle housing and an axle input shaft arranged in the axle housing. The axle input shaft is drivingly connected to the reduction gearbox output component 13. The motor housing 11 and the axle housing are fixedly connected to the reduction gearbox housing 11.

The motor output shaft 221 is drivingly connected to the reduction gearbox input shaft 12, the axle input shaft is drivingly connected to the reduction gearbox output component 13, and the reduction gearbox input shaft 12 is drivingly connected to the reduction gearbox output component 13, so that the motor 2 can drive the axle to rotate to meet basic functions of the drive assembly. The motor housing 211 and the axle housing are fixedly connected to the reduction gearbox housing 11. Through the fixed connection between the motor housing 211 and the reduction gearbox housing 11, the motor housing 211 can be integrated into the reduction gearbox housing 11. The motor housing 211 and the reduction gearbox housing 11 no longer serve as parts on two separate members, so that the motor housing 211 and the reduction gearbox housing 11 can be fitted with each other as closely as possible, and a gap between the motor housing 211 and the reduction gearbox housing 11 is minimized as much as possible, thereby enabling a connection structure between the motor 2 and the reduction gearbox 1 drivingly connected to each other to be more compact. Through the fixed connection between the axle housing and the reduction gearbox housing 11, the axle housing can be integrated into the reduction gearbox housing 11. The axle housing and the reduction gearbox housing 11 no longer serve as parts on two separate members, so that the axle housing and the reduction gearbox housing 11 can be fitted with each other as closely as possible, and a gap between the axle housing and the reduction gearbox housing 11 is minimized as much as possible, thereby enabling a connection structure between the axle and the reduction gearbox 1 drivingly connected to each other to be more compact. The drive assembly with a more compact structure can free up more available space for the vehicle, or facilitate the overall miniaturization of the vehicle.

When the motor 2 is energized, driven by a changing magnetic field of the motor stator 212, the motor rotor 22 rotates relative to the motor housing 211, so that the motor output shaft 221 on the motor rotor 22 drives the reduction gearbox input shaft 12 to rotate.

In an embodiment of the present disclosure, the motor housing 211 and the reduction gearbox housing 11 are connected by a bolt. The reduction gearbox housing 11 has a first threaded hole, the motor housing 211 has a first through hole, and the bolt passes through the first through hole to be screwed into the first threaded hole to allow the motor housing 211 to be fixedly connected to the reduction gearbox housing 11.

In an embodiment of the present disclosure, the motor housing 211 and the reduction gearbox housing 11 may be fixedly connected by welding.

In an embodiment of the present disclosure, the axle housing and the reduction gearbox housing 11 are connected by a bolt. The reduction gearbox housing 11 has a second threaded hole, the axle housing has a second through hole, and the bolt passes through the second through hole to be screwed into the second threaded hole to allow the axle housing to be fixedly connected to the reduction gearbox housing 11.

In an embodiment of the present disclosure, the axle housing and the reduction gearbox housing 11 may also be fixedly connected by welding.

In an embodiment of the present disclosure, the axle and the motor 2 may be located on a same side of the reduction gearbox housing 11. In such structural form, the motor 2, the axle, and the reduction gearbox 1 can be more compact and occupy less space.

In an embodiment of the present disclosure, the axle may be located on a first side of the reduction gearbox housing 11, the motor 2 may be located on a second side of the reduction gearbox housing 11, and the first side and the second side are two opposite sides of the reduction gearbox housing.

In an embodiment of the present disclosure, referring to FIG. 1, the axle may be a rear axle 3, and a rear axle housing 31 of the rear axle 3 is fixedly connected to the reduction gearbox housing 11.

In an embodiment of the present disclosure, the rear axle 3 and the motor 2 may be located on a same side of the reduction gearbox housing 11.

In an embodiment of the present disclosure, the rear axle 3 is located on a first side of the reduction gearbox housing 11, and the motor 2 is located on a second side of the reduction gearbox housing 11.

In an embodiment of the present disclosure, a front axle is arranged on a side of the reduction gearbox housing 11 facing away from the rear axle 3.

In an embodiment of the present disclosure, the axle may also be a front axle, and a front axle housing of the front axle is fixedly connected to the reduction gearbox housing 11.

Figure 2:
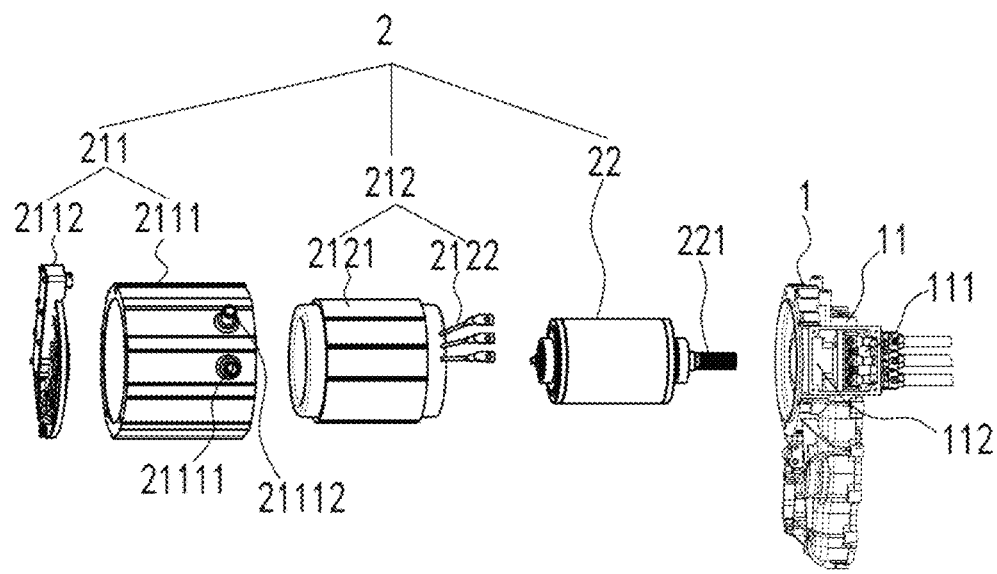
FIG. 2 is an exploded view of a drive assembly according to an embodiment of the present disclosure, in which a rear axle is omitted.

In an embodiment of the present disclosure, referring to FIG. 2, the motor housing 211 includes a motor shell 2111 and a motor end cover 2112. The motor shell 2111 is fixedly connected to the reduction gearbox housing 11. The motor end cover 2112 is arranged at an end of the motor shell 2111 facing away from the reduction gearbox housing 11. The motor end cover 2112 is detachably connected to the motor shell 2111. The motor stator 212 is arranged in the motor shell 2111 and fixedly connected to the motor shell 2111. In such structural form, during the mounting of the motor stator 212 and the motor rotor 22, the motor end cover 2112 can be removed from the motor shell 2111, two ends of the motor shell 2111 are open, and the motor rotor 22 and the motor stator 212 can be assembled into the motor shell 2111 from either end of the motor shell 2111. The motor stator 212 and the motor rotor 22 assembled in the motor shell 2111 can be adjusted properly from the two ends of the motor shell 2111. The assembling and disassembling operations are convenient, which is conducive to the mounting of the motor rotor 22 and the motor stator 212 in the motor shell 2111.

In an embodiment of the present disclosure, the motor end cover 2112 and the motor shell 2111 may be detachably connected by a bolt.

In an embodiment of the present disclosure, referring to FIG. 2, the motor shell 2111 has a coolant channel, a first interface 21111, and a second interface 21112, the first interface 21111 and the second interface 21112 are located at two ends of the coolant channel, and the first interface 21111 and the second interface 21112 are communicated with the coolant channel. In such structural form, a coolant can enter the coolant channel from the first interface 21111 and flow out of the motor shell 2111 from the second interface 21112 after flowing through the coolant channel, so as to cool the motor 2. The coolant can also enter the coolant channel from the second interface 21112, and flow out of the motor shell 2111 from the first interface 21111 after flowing through the coolant channel, so as to cool the motor 2. This also means that the motor 2 may be a water-cooled motor.

In an embodiment of the present disclosure, the motor end cover 2112 may also be integrally formed with the motor shell 2111.

In an embodiment of the present disclosure, referring to FIG. 2, the motor stator 212 includes a stator body 2121 and a stator winding 2122 arranged on the stator body 2121. The reduction gearbox housing 11 has a power supply cable connection chamber 111, and the stator winding 2122 extends into the power supply cable connection chamber 111. In such structural form, it is convenient for the stator winding 2122 of the motor to be connected with a power supply cable. For example, an insulated threaded hole may be formed at a position on the reduction gearbox housing 11 where the power supply cable connection chamber 111 is. An end of a power supply cable of each phase of a three-phase power supply has a first connecting terminal, and an end of the corresponding stator winding 2122 has a second connecting terminal. The first connecting terminal and the second connecting terminal each have a through hole, and a bolt passes through the through hole of the first connecting terminal and the through hole of the second connecting terminal and then is screwed into the insulated threaded hole, so as to tighten the first connecting terminal and the second connecting terminal to realize an electrical connection between the first connecting terminal and the second connecting terminal. That is, the power supply cable of each phase of the three-phase power supply is electrically connected to the corresponding stator winding 2122, so that the motor 2 can be connected to the three-phase power supply.

In an embodiment of the present disclosure, referring to FIG. 2, the motor output shaft 221 may be a solid shaft.

In an embodiment of the present disclosure, the motor output shaft 221 may also be a hollow shaft.

Figure 3:
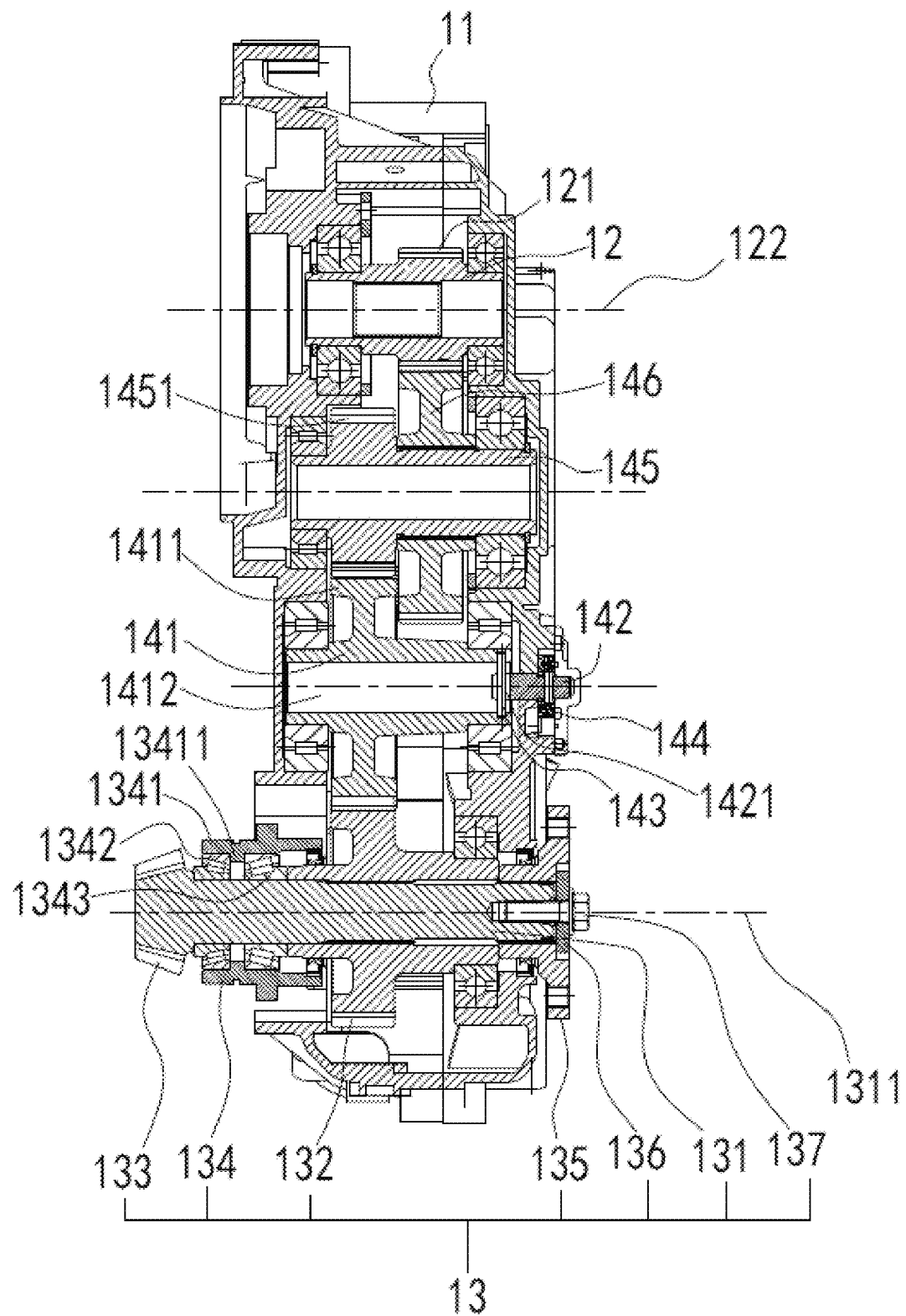
FIG. 3 is a schematic view of a reduction gearbox according to an embodiment of the present disclosure.
Figure 4:
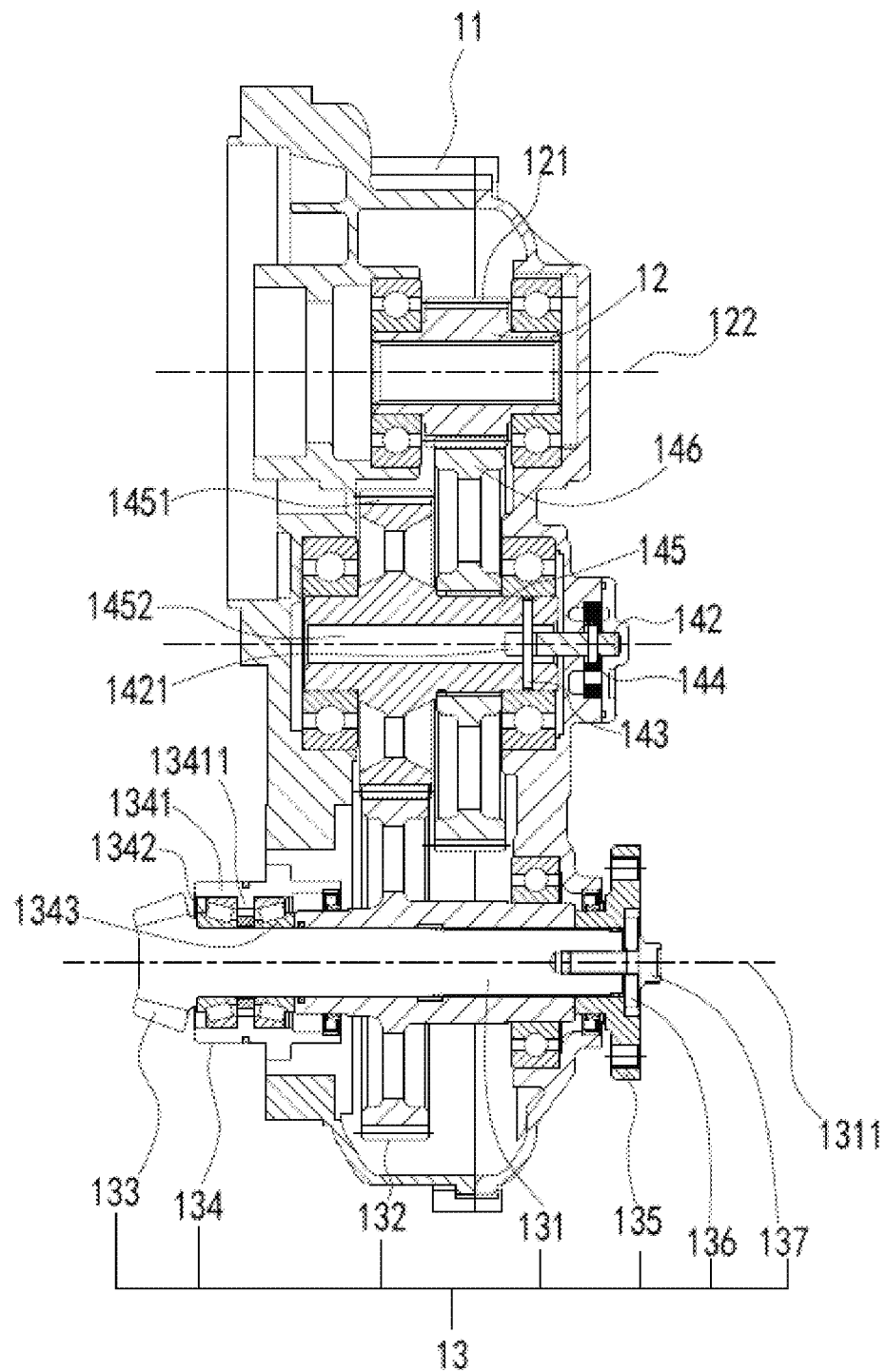
FIG. 4 is a schematic view of a reduction gearbox according to an embodiment of the present disclosure.

In an embodiment of the present disclosure, referring to FIG. 3 and FIG. 4, the reduction gearbox input shaft 12 is a hollow shaft, and a specific connection structure of the driving connection formed between the reduction gearbox input shaft 12 and the motor output shaft 221 may have a variety of structural forms.

It may be understood that the reduction gearbox input shaft 12 and the motor output shaft 221 may be drivingly connected by flat key connection. For example, a flat key is arranged on the motor output shaft 221, a keyway is formed on an inner side of the reduction gearbox output shaft 131, and the flat key is arranged in the keyway. When the motor output shaft 221 rotates, the rotational motion of the motor output shaft 221 is transferred to the reduction gearbox input shaft 12 through the fit between the flat key and the keyway, so that the reduction gearbox input shaft 12 rotates with the rotation of the motor output shaft 221.

It may be understood that the reduction gearbox input shaft 12 and the motor output shaft 221 may be drivingly connected by spline connection. For example, an external spline is formed on the motor output shaft 221, and an internal spline is formed on the inner side of the reduction gearbox input shaft 12. When the motor output shaft 221 rotates, the rotational motion of the motor output shaft 221 is transferred to the reduction gearbox input shaft 12 through the fit between the external spline of the motor output shaft 221 and the internal spline of the reduction gearbox input shaft 12, so that the reduction gearbox input shaft 12 rotates with the rotation of the motor output shaft 221.

In an embodiment of the present disclosure, referring to FIG. 4, the reduction gearbox 1 further includes a first gear 121, a first transmission shaft 145, a second gear 146, and a third gear 1451. The first gear 121 is fixedly connected to the reduction gearbox input shaft 12. The first transmission shaft 145 is arranged in the reduction gearbox housing 11. The second gear 146 is fixedly connected to the first transmission shaft 145, and the second gear 146 engages with the first gear 121. The third gear 1451 is fixed to the first transmission shaft 145, and the third gear 1451 and the second gear 146 are arranged along an axial direction of the first transmission shaft 145. The reduction gearbox output component 13 includes a reduction gearbox output shaft 131, a fourth gear 132, and a fifth gear 133. The reduction gearbox output shaft 131 is arranged in the reduction gearbox housing 11. The fourth gear 132 is fixedly connected to the reduction gearbox output shaft 131, and the third gear 1451 is drivingly connected to the fourth gear 132. The fifth gear 133 is fixedly connected to the reduction gearbox output shaft 131. The fourth gear 132 and the fifth gear 133 are arranged along an axial direction of the reduction gearbox output shaft 131. The axle input shaft is provided with an axle transmission gear, and the axle transmission gear meshes with the fifth gear 133. In such structural form, the reduction gearbox 1 is a three-shaft reduction gearbox. The rotational motion of the motor output shaft 221 is transferred to the fourth gear 132 through the reduction, gearbox input shaft 12, the first gear 121, the second gear 146, the first transmission shaft 145, and the third gear 1451, and the rotational motion of the motor output shaft 221 is further transferred to the axle input shaft through the fourth gear 132, the reduction gearbox output shaft 131, and the fifth gear 133. For example, when the axle is the rear axle 3, the rotational motion of the motor output shaft 221 is further transferred to a rear axle input shaft through the fourth gear 132, the reduction gearbox output shaft 131, and the fifth gear 133. The axle transmission gear is formed on the rear axle input shaft. In such structural form, the reduction gearbox 1 forms transmission of at least three shafts, so as to drive the front axle and the rear axle 3 by the motor 2.

In an embodiment of the present disclosure, the first gear 121 may be integrally formed with the reduction gearbox input shaft 12 to allow the first gear 121 to be fixedly connected to the reduction gearbox input shaft 12.

In an embodiment of the present disclosure, the flat key connection or the spline connection may be adopted between the second gear 146 and the first transmission shaft 145 to achieve a circumferentially fixed connection between the second gear 146 and the first transmission shaft 145. One end of the second gear 146 abuts against the third gear 1451, and the other end of the second gear 146 abuts against a bearing fixed in the reduction gearbox housing 11, so as to fix the second gear 132 along the axial direction of the first transmission shaft 145. In this way, the second gear 146 is fixedly connected to the first transmission shaft 145.

In an embodiment of the present disclosure, the second gear 146 may be integrally formed with the first transmission shaft 145 to allow the second gear 146 to be fixedly connected to the first transmission shaft 145.

In an embodiment of the present disclosure, the third gear 1451 may be integrally formed with the first transmission shaft 145 to allow the third gear 1451 to be fixedly connected to the first transmission shaft 145.

In an embodiment of the present disclosure, the flat key connection or the spline connection may be adopted between the third gear 1451 and the first transmission shaft 145 to achieve a circumferentially fixed connection between the third gear 1451 and the first transmission shaft 145. One end of the third gear 1451 abuts against the second gear 146, and the other end of the third gear 1451 abuts against another bearing fixed in the reduction gearbox housing 11, so as to fix the third gear 1451 along the axial direction of the first transmission shaft 145. In this way, the third gear 1451 is fixedly connected to the first transmission shaft 145.

In an embodiment of the present disclosure, the fourth gear 132 may be integrally formed with the reduction gearbox output shaft 131 to allow the fourth gear 132 to be fixedly connected to the reduction gearbox output shaft 131.

In an embodiment of the present disclosure, the fourth gear 132 may also be fixedly connected to the reduction gearbox output shaft 131 by means of being circumferentially fixed and axially fixed with respect to the reduction gearbox output shaft 131. For example, the circumferential fixing between the fourth gear 132 and the reduction gearbox output shaft 131 may be realized by the flat key connection or the spline connection. The axial fixing of the fourth gear 132 relative to the reduction gearbox output shaft 131 may be realized by using an axial positioning mechanism 134.

In an embodiment of the present disclosure, the fifth gear 133 may be integrally formed with the reduction gearbox output shaft 131 to allow the fifth gear 133 to be fixedly connected to the reduction gearbox output shaft 131.

In an embodiment of the present disclosure, the fifth gear 133 may also be fixedly connected to the reduction gearbox output shaft 131 by means of being circumferentially fixed and axially fixed with respect to the reduction gearbox output shaft 131.

In an embodiment of the present disclosure, the fifth gear 133 may be fixed to an end of the reduction gearbox output shaft 131 facing towards the motor housing 211. In such structural form, the rear axle 3 can be integrated to a side of the reduction gearbox housing 11 facing towards the motor housing 211. That is, the rear axle 3 and the motor housing 211 are located on a same side of the reduction gearbox housing 11, so that the rear axle 3, the reduction gearbox 1, and the motor 2 are more compact and occupy less space.

In an embodiment of the present disclosure, the fifth gear 133 may also be fixed to an end of the reduction gearbox output shaft 131 facing away from the motor housing 211.

In an embodiment of the present disclosure, referring to FIG. 3, the reduction gearbox 1 further includes a second transmission shaft 141 and a sixth gear 1411. The second transmission shaft 141 is arranged in the reduction gearbox housing IL The sixth gear 1411 is fixedly connected to the second transmission shaft 141, and the sixth gear 1411 meshes with the third gear 1451 and the fourth gear 132 respectively. In such structural form, the reduction gearbox 1 is a four-shaft reduction gearbox. Due to a large number of shafts of the reduction gearbox 1, a diameter of a pitch circle of the gear on each shaft may be made relatively small. Thus, a linear velocity of the gear on each shaft at the pitch circle is relatively small when the reduction gearbox 1 operates, which can reduce the noise of the reduction gearbox 1 during operation.

In an embodiment of the present disclosure, the axle transmission gear may be a bevel gear, and the fifth gear 133 may be a bevel gear.

In an embodiment of the present disclosure, the first gear 121, the second gear 146, the third gear 1451, and the fourth gear 132 may be cylindrical gears.

In an embodiment of the present disclosure, the sixth gear 1411 may be a cylindrical gear.

In an embodiment of the present disclosure, referring to FIG. 3 and FIG. 4, the reduction gearbox 1 further includes an oil pump input shaft 142 and an oil pump 144.

In an embodiment of the present disclosure, one end of the oil pump input shaft 142 is drivingly connected to the first transmission shaft 145, and the other end of the oil pump input shaft 142 is drivingly connected to the oil pump 144. The oil pump 144 is driven to operate by the first transmission shaft 145 and, the oil pump input shaft 142, so as to lubricate and cool surfaces of a friction pair in the reduction gearbox 1.

In an embodiment of the present disclosure, one end of the oil pump input shaft 142 is drivingly connected to the second transmission shaft 141, and the other end of the oil pump input shaft 142 is drivingly connected to the oil pump 144. The oil pump 144 is driven to operate by the second transmission shaft 141 and the oil pump input shaft 142, so as to lubricate and cool surfaces of a friction pair in the reduction gearbox 1.

In an embodiment, the reduction gearbox further includes a first pin shaft 143.

In an embodiment of the present disclosure, referring to FIG. 4, a first mounting chamber 1452 is formed on an inner side of the first transmission shaft 145. The oil pump input shaft 142 is partially located in the first mounting chamber 1452, and a mounting hole 1421 is formed at an end of the oil pump input shaft 142 facing towards the first mounting chamber 1452. The first pin shaft 143 is inserted into the first transmission shaft 145 along a radial direction of the first transmission shaft 145, and the first pin shaft 143 penetrates the first mounting chamber 1452 and the mounting hole 1421. The oil pump 144 is arranged at an end of the oil pump input shaft 142 away from the first mounting chamber 1452, In such structural form, the driving connection between the first transmission shaft 145 and the oil pump input shaft 142 is realized through the first pin shaft 143.

In an embodiment of the present disclosure, referring to FIG. 3, a second mounting chamber 1412 is formed inside the second transmission shaft 1411, the oil pump input shaft 142 is partially located in the second mounting chamber 1412, and a mounting hole 1421 is formed at an end of the oil pump input shaft 142 facing towards the second mounting chamber 1412. The first pin shaft 143 is inserted into the second transmission shaft 141 along a radial direction of the second transmission shaft 141, and the first pin shaft 143 penetrates the second mounting chamber 1412 and the mounting hole 1421, The oil pump 144 is arranged at an end of the oil pump input shaft 142 away from the second mounting chamber 1412. In such structural form, the driving connection between the second transmission shaft 141 and the oil pump input shaft 142 is realized through the first pin shaft 143.

In an embodiment of the present disclosure, referring to FIG. 3, the mounting hole 1421 may be a long hole, and a length direction of the long hole is the axial direction of the first transmission shaft 145 or the second transmission shaft 141, In such structural form, the first pin shaft 143 passes through the mounting hole 1421, so that a position of the oil pump input shaft 142 in the axial direction of the first transmission shaft 145 or the second transmission shaft 141 can have a certain fault tolerance. When the assembling accuracy is not high, a large stress caused by abutment of the oil pump input shaft 142 and the first pin shaft 143 along the axial direction of the first transmission shaft 145 or the second transmission shaft 141 can also be prevented.

In an embodiment of the present disclosure, the mounting hole 1421 may also be a round hole.

In an embodiment of the present disclosure, the reduction gearbox housing 11 has an oil storage chamber, and the oil pump 144 pumps oil in the oil storage chamber to a target position, for example, the surfaces of the friction pair in the reduction gearbox 1.

In an embodiment of the present disclosure, the oil pump 144 may be an internal gear pump.

In an embodiment of the present disclosure, referring to FIG. 4, the oil storage chamber is located an end of the first transmission shaft 145. For example, the oil storage chamber may be located at an end of the first transmission shaft 145 facing away from the motor housing 211, and generally located at a bottom of the reduction gearbox 1.

In an embodiment of the present disclosure, referring to FIG. 3, the oil storage chamber is located at an end of the second transmission shaft 141, and generally located at a bottom of the reduction gearbox 1. For example, the oil storage chamber may be located at an end of the second transmission shaft 141 facing away from the motor housing 211.

In an embodiment of the present disclosure, referring to FIG. 3 and FIG. 4, the reduction gearbox output component 13 further includes an axial positioning mechanism 134, two ends of the axial positioning mechanism 134 abut against the fifth gear 133 and the fourth gear 132 respectively, and the axial positioning mechanism 134 is fitted over the reduction gearbox output shaft 131.

In an embodiment of the present disclosure, referring to FIG. 3 and FIG. 4, the axial positioning mechanism 134 includes a positioning shell 1341, a first tapered roller bearing 1342, and a second tapered roller bearing 1343. The positioning shell 1341 includes a stop ring 13411 on a radial inner side. The first tapered roller bearing 1342 and the second tapered roller bearing 1343 are fitted over the reduction gearbox output shaft 131. The first tapered roller bearing 1342 is arranged between the stop ring 13411 and the fifth gear 133, an outer ring of the first tapered roller bearing 1342 abuts against the stop ring 13411, an inner ring of the first tapered roller bearing 1342 abuts against the fifth gear 133, and an opening direction of a taper of the first tapered roller bearing 1342 faces towards the fifth gear 133. The second tapered roller bearing 1343 is arranged between the stop ring 13411 and the fourth gear 132, an outer ring of the second tapered roller bearing 1343 abuts against the stop ring 13411, and an inner ring of the second tapered roller bearing 1343 abuts against the fourth gear 132. In such structural form, when the fourth gear 132 is pressed against the second tapered roller bearing 1343 towards the fifth gear 133, the first tapered roller bearing 1342 and the second tapered roller bearing 1343 may produce an axial reaction force, thus playing a role of axial positioning.

In an embodiment of the present disclosure, the axial positioning mechanism 134 may be a rigid shaft sleeve, the rigid shaft sleeve is fitted over the reduction gearbox output shaft 131, and two ends of the rigid shaft sleeve abut against the fifth gear 133 and the fourth gear 132 respectively.

In an embodiment of the present disclosure, referring to FIG. 3, the reduction gearbox output component 13 includes a connection apparatus 135, the connection apparatus 135 abuts against an end of the fourth gear 132 facing away from the motor housing 211, and the connection apparatus 135 is fixedly connected to the reduction gearbox output shaft 131.

In an embodiment of the present disclosure, the connection apparatus 135 may be integrally formed with the reduction gearbox output shaft 131 to allow the connection apparatus 135 to be fixed to the reduction gearbox output shaft 131.

In an embodiment of the present disclosure, the connection apparatus 135 may be fixed to the reduction gearbox output shaft 131 by means of the circumferential fixing and the axial fixing between the connection apparatus 135 and the reduction gearbox output shaft 131. For example, referring to FIG. 3, the connection apparatus 135 and the reduction gearbox output shaft 131 may be connected by a flat key, or the connection apparatus 135 and the reduction gearbox output shaft 131 may also be connected by a spline, so that the connection apparatus 135 is circumferentially fixed with the reduction gearbox output shaft 131.

In an embodiment of the present disclosure, referring to FIG. 3, the connection apparatus 135 includes a connecting flange, and the front axle includes a front axle body and a front axle input shaft rotatably connected to the front axle body. The connecting flange is fixedly connected to the front axle input shaft, so that the connection apparatus 135 drives the front axle input shaft to rotate when the connection apparatus 135 rotates.

In an embodiment of the present disclosure, referring to FIG. 3, the reduction gearbox output component 13 includes a shaft end baffle 136, the shaft end baffle 136 is located at an end of the connection apparatus 135 facing away from the fourth gear 132, and the shaft end baffle 136 abuts against the connection apparatus 135. The shaft end baffle 136 is configured to compress the connection apparatus 135 to axially fix the connection apparatus 135.

In an embodiment of the present disclosure, referring to FIG. 3, the reduction gearbox output component 13 includes a fixing member 137, the fixing member 137 passes through the shaft end baffle 136 to be connected to the reduction gearbox output shaft 131, and the fixing member 137 abuts against a side of the shaft end baffle 136 facing away from the reduction gearbox output shaft 131. Through the connection between the fixing member 137 and the reduction gearbox output shaft 131, the fixing member 137 is pressed against the side of the shaft end baffle 136 facing away from the reduction gearbox output shaft 131, and the shaft end baffle 136 applies a force towards the fifth gear 133 to the connection apparatus 135, so that the connection apparatus 135, the fourth gear 132, and the axial positioning mechanism 134 are pressed between the fifth gear 133 and the shaft end baffle 136 to form the axial positioning, and the shaft end baffle 136, the connection apparatus 135, the fourth gear 132, and the axial positioning mechanism 134 have fixed positions along the axial direction of the reduction gearbox output shaft 131.

It may be understood that the fifth gear 133 and the connection apparatus 135 are located on two ends of the reduction gearbox output shaft 131 respectively, the axle transmission gear arranged on the rear axle input shaft meshes with the fifth gear 133, and the connection apparatus 135 is connected to the front axle, so that the rear axle 3 can be connected to a side of the reduction gearbox 1, and the front axle is connected to a side of the reduction gearbox 1 opposite the rear axle 3. The motor output shaft 221 drives the reduction gearbox input shaft 12 to rotate, the reduction gearbox input shaft 12 drives the reduction gearbox output shaft 131 to rotate, and the reduction gearbox output shaft 131 drives the fifth gear 133 and the connection apparatus 135 to rotate, so as to drive the rear axle 3 and the front axle respectively. In this way, one reduction gearbox output shaft 131 can simultaneously drive the rear axle 3 and the front axle, so that the overall structure of the drive assembly is relatively compact.

It may be understood that, as shown in FIG. 4, the reduction gearbox input shaft 12 is driven by the motor output shaft 221 to rotate, the first gear 121 on the reduction gearbox input shaft 12 drives the second gear 146 meshing with the first gear 121 to rotate, the second gear 146 drives the first transmission shaft 145 to rotate, the third gear 1451 on the first transmission shaft 145 drives the fourth gear 132 meshing with the third gear 1451 to rotate, and the fourth gear 132 drives the reduction gearbox output shaft 131 to rotate. The fifth gear 133 on the reduction gearbox output shaft 131 drives the axle transmission gear meshing with the fifth gear 133 to rotate, and the axle transmission gear on the rear axle input shaft rotates to drive the entire rear axle input shaft to rotate, so as to drive the rear axle 3 by the motor 2. The reduction gearbox output shaft 131 drives the connection apparatus 135 to rotate, and the connection apparatus 135 drives the front axle input shaft to rotate, so as to drive the front axle by the motor 2. The second gear 146 drives the first transmission shaft 145 to rotate, the first pin shaft 143 inserted into the first transmission shaft 145 rotates together with the first transmission shaft 145 and then drives the oil pump input shaft 142 fitted over the first pin shaft 143 to rotate, so that the oil pump 144 is in an operating state.

It may be understood that, as shown in FIG. 3, the reduction gearbox input shaft 12 is driven by the motor output shaft 221 to rotate, the first gear 121 on the reduction gearbox input shaft 12 drives the second gear 146 meshing with the first gear 121 to rotate, the second gear 146 drives the first transmission shaft 145 to rotate, the third gear 1451 on the first transmission shaft 145 drives the sixth gear 1411 meshing with the third gear 1451 to rotate, the sixth gear 1411 on the second transmission shaft 141 drives the fourth gear 132 meshing with the sixth gear 1411 to rotate, and the fourth gear 132 drives the reduction gearbox output shaft 131 to rotate. The fifth gear 133 on the reduction gearbox output shaft 131 drives the axle transmission gear meshing with the fifth gear 133 to rotate, and the axle transmission gear on the rear axle input shaft rotates to drive the rear axle input shaft to rotate, so as to drive the rear axle 3 by the motor 2. The reduction gearbox output shaft 131 drives the connection apparatus 135 to rotate, and the connection apparatus 135 drives the front axle input shaft to rotate, so as to drive the front axle by the motor 2. The sixth gear 1411 on the second transmission shaft 141 rotates, the first pin shaft 143 inserted into the second transmission shaft 141 rotates together with the second transmission shaft 141 and then drives the oil pump input shaft 142 fitted over the first pin shaft 143 to rotate, so that the oil pump 144 is in an operating state.

In an embodiment of the present disclosure, referring to FIG. 3, the reduction gearbox input shaft 12 has a first central axis 122, the reduction gearbox input shaft 12 can rotate around the first central axis 122, the reduction gearbox output component 13 has a second central axis 1311, the reduction gearbox output component 13 can rotate around the second central axis 1311, and the first central axis is parallel to the second central axis. In such structural form, the rotational motion can be transferred relatively smoothly during the operation of the reduction gearbox 1.

Various embodiments/implementations provided in the present disclosure may be combined with each other without contradiction.

The above are only preferred embodiments of the present disclosure and are not intended to limit the present disclosure. The present disclosure may be subject to various changes and variations for those skilled in the art. Any modification, equivalent replacement, improvement, or the like made within the spirit and principle of the present disclosure shall fall within the protection scope of the present disclosure.

What is claimed is:

1. A drive assembly, comprising:
a reduction gearbox comprising a reduction gearbox housing, a reduction gearbox input shaft, and a reduction gearbox output component, the reduction gearbox input shaft and the reduction gearbox output component being arranged in the reduction gearbox housing, the reduction gearbox input shaft being drivingly connected to the reduction gearbox output component;
a motor comprising a motor housing, a motor stator, and a motor rotor, the motor stator being arranged in the motor housing and fixedly connected to the motor housing, the motor rotor being arranged in the motor stator, the motor rotor comprising a motor output shaft, the motor output shaft being drivingly connected to the reduction gearbox input shaft; and
an axle comprising an axle housing and an axle input shaft arranged in the axle housing, the axle input shaft being drivingly connected to the reduction gearbox output component,
wherein the motor housing and the axle housing are fixedly connected to the reduction gearbox housing; and
the motor housing comprises a motor shell and a motor end cover, the motor shell is fixedly connected to the reduction gearbox housing, the motor end cover is arranged at an end of the motor shell facing away from the reduction gearbox housing, and the motor stator is arranged in the motor shell and fixedly connected to the motor shell.

2. The drive assembly of claim 1, wherein the motor housing and the reduction gearbox housing are connected by a bolt.

3. The drive assembly of claim 1, wherein the axle housing and the reduction gearbox housing are connected by a bolt.

4. The drive assembly of claim 1, wherein the axle is a rear axle.

5. The drive assembly of claim 1, wherein the axle and the motor are located on a same side of the reduction gearbox housing.

6. The drive assembly of claim 1, wherein the axle is located on a first side of the reduction gearbox housing, the motor is located on a second side of the reduction gearbox housing, and the first side and the second side are two opposite sides of the reduction gearbox housing.

7. The drive assembly of claim 1, wherein the motor shell has a coolant channel, a first interface, and a second interface, the first interface and the second interface are located at two ends of the coolant channel respectively, and the first interface and the second interface are communicated with the coolant channel.

8. The drive assembly of claim 1, wherein the motor stator comprises a stator body and a stator winding arranged on the stator body;
wherein the reduction gearbox housing has a power supply cable connection chamber, and the stator winding extends into the power supply cable connection chamber.

9. A drive assembly, comprising:
a reduction gearbox comprising a reduction gearbox housing, a reduction gearbox input shaft, and a reduction gearbox output component, the reduction gearbox input shaft and the reduction gearbox output component being arranged in the reduction gearbox housing, the reduction gearbox input shaft being drivingly connected to the reduction gearbox output component;
a motor comprising a motor housing, a motor stator, and a motor rotor, the motor stator being arranged in the motor housing and fixedly connected to the motor housing, the motor rotor being arranged in the motor stator, the motor rotor comprising a motor output shaft, the motor output shaft being drivingly connected to the reduction gearbox input shaft; and
an axle comprising an axle housing and an axle input shaft arranged in the axle housing, the axle input shaft being drivingly connected to the reduction gearbox output component,
wherein the motor housing and the axle housing are fixedly connected to the reduction gearbox housing;
wherein the axle input shaft is provided with an axle transmission gear;
wherein the reduction gearbox further comprises:
a first gear fixedly connected to the reduction gearbox input shaft;
a first transmission shaft arranged in the reduction gearbox housing;
a second gear fixedly connected to the first transmission shaft, the second gear meshing with the first gear; and
a third gear fixedly connected to the first transmission shaft, the third gear and the second gear being arranged along an axial direction of the first transmission shaft; and
wherein the reduction gearbox output component comprises:
a reduction gearbox output shaft arranged in the reduction gearbox housing;
a fourth gear fixedly connected to the reduction gearbox output shaft, the third gear being drivingly connected to the fourth gear; and
a fifth gear fixedly connected to the reduction gearbox output shaft, the fourth gear and the fifth gear being arranged along an axial direction of the reduction gearbox output shaft, the axle transmission gear meshing with the fifth gear.

10. The drive assembly of claim 9, wherein the reduction gearbox further comprises:
a second transmission shaft arranged in the reduction gearbox housing; and
a sixth gear fixedly connected to the second transmission shaft, the sixth gear meshing with the third gear and the fourth gear respectively.

11. The drive assembly of claim 10, wherein the reduction gearbox further comprises an oil pump input shaft and an oil pump, one end of the oil pump input shaft is drivingly connected to the second transmission shaft, and the other end of the oil pump input shaft is drivingly connected to the oil pump.

12. The drive assembly of claim 11, wherein the reduction gearbox further comprises a first pin shaft,
a second mounting chamber is formed inside the second transmission shaft, the oil pump input shaft is partially located in the second mounting chamber, a mounting hole is formed at an end of the oil pump input shaft located in the second mounting chamber, the first pin shaft is inserted into the second transmission shaft along a radial direction of the second transmission shaft, and the first pin shaft penetrates the second mounting chamber and the mounting hole, and
the oil pump is arranged at an end of the oil pump input shaft located outside the second mounting chamber.

13. The drive assembly of claim 9, wherein the reduction gearbox output component further comprises:
an axial positioning mechanism, two ends of the axial positioning mechanism abutting against the fourth gear and the fifth gear respectively, the axial positioning mechanism being fitted over the reduction gearbox output shaft;
a connection apparatus abutting against an end of the fourth gear facing away from the fifth gear and being fixedly connected to the reduction gearbox output shaft; and
a shaft end baffle located at an end of the connection apparatus facing away from the fourth gear and abutting against the connection apparatus.

14. The drive assembly of claim 13, wherein the axial positioning mechanism comprises:
a positioning shell having a stop ring on a radial inner side;
a first tapered roller bearing fitted over the reduction gearbox output shaft and arranged between the stop ring and the fifth gear, an outer ring of the first tapered roller bearing abutting against the stop ring, an inner ring of the first tapered roller bearing abutting against the fifth gear, and an opening direction of a taper of the first tapered roller bearing facing towards the fifth gear; and
a second tapered roller bearing fitted over the reduction gearbox output shaft and arranged between the stop ring and the fourth gear, an outer ring of the second tapered roller bearing abutting against the stop ring, and an inner ring of the second tapered roller bearing abutting against the fourth gear.

15. The drive assembly of claim 13, wherein the reduction gearbox output component further comprises a fixing member, the fixing member passes through the shaft end baffle to be connected to the reduction gearbox output shaft, and the fixing member abuts against a side of the shaft end baffle facing away from the reduction gearbox output shaft.

16. The drive assembly of claim 9, wherein the reduction gearbox further comprises an oil pump input shaft and an oil pump, one end of the oil pump input shaft is drivingly connected to the first transmission shaft, and the other end of the oil pump input shaft is drivingly connected to the oil pump.

17. The drive assembly of claim 16, wherein the reduction gearbox further comprises a first pin shaft,
- a first mounting chamber is formed on an inner side of the first transmission shaft, the oil pump input shaft is partially located in the first mounting chamber, a mounting hole is formed at an end of the oil pump input shaft located in the first mounting chamber, the first pin shaft is inserted into the first transmission shaft along a radial direction of the first transmission shaft, and the first pin shaft penetrates the first mounting chamber and the mounting hole, and
- the oil pump is arranged at an end of the oil pump input shaft located outside the first mounting chamber.

18. A vehicle, comprising a drive assembly, the drive assembly comprising:
- a reduction gearbox comprising a reduction gearbox housing, a reduction gearbox input shaft, and a reduction gearbox output component, the reduction gearbox input shaft and the reduction gearbox output component being arranged in the reduction gearbox housing, the reduction gearbox input shaft being drivingly connected to the reduction gearbox output component;
- a motor comprising a motor housing, a motor stator, and a motor rotor, the motor stator being arranged in the motor housing and fixedly connected to the motor housing, the motor rotor being arranged in the motor stator, the motor rotor comprising a motor output shaft, the motor output shaft being drivingly connected to the reduction gearbox input shaft; and
- an axle comprising an axle housing and an axle input shaft arranged in the axle housing, the axle input shaft being drivingly connected to the reduction gearbox output component,
- wherein the motor housing and the axle housing are fixedly connected to the reduction gearbox housing; and
- the motor housing comprises a motor shell and a motor end cover, the motor shell is fixedly connected to the reduction gearbox housing, the motor end cover is arranged at an end of the motor shell facing away from the reduction gearbox housing, and the motor stator is arranged in the motor shell and fixedly connected to the motor shell.

19. The vehicle of claim 18, wherein the vehicle is an all-terrain vehicle.

* * * * *